(No Model.)
C. PARKER.
STREET CAR RAIL.
No. 566,012. Patented Aug. 18, 1896.
Fig. 1.
Fig. 2.
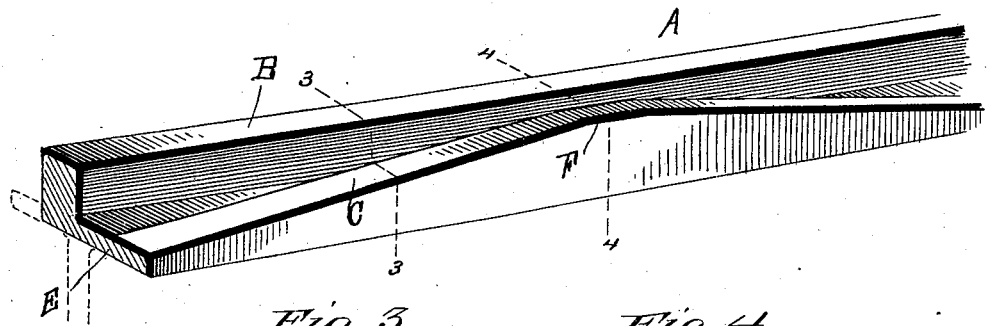
Fig. 3. Fig. 4.
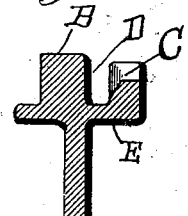
Witnesses:
L. C. Hill
A. L. Hough
Inventor:
Charles Parker,
by Franklin H. Hough
Atty.

UNITED STATES PATENT OFFICE.

CHARLES PARKER, OF MONROEVILLE, OHIO.

STREET-CAR RAIL.

SPECIFICATION forming part of Letters Patent No. 566,012, dated August 18, 1896.

Application filed May 29, 1896. Serial No. 593,620. (No model.)

*To all whom it may concern:*

Be it known that I, CHARLES PARKER, a citizen of the United States, residing at Monroeville, in the county of Huron and State of Ohio, have invented certain new and useful Improvements in Street-Car Rails; and I do declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to certain new and useful improvements in rails for use upon street-railways, and it has more particular reference to rails of that character which are designed to afford both a track for the passage of car-wheels, and also a bearing surface or track for the accommodation of the wheels of wagons and other vehicles.

It is a well-known fact that in cases in which wagons and other vehicles, especially when loaded, are driven upon street-car tracks, in which the rails are of the ordinary form of construction, it is always difficult, and at times, especially when the rails are wet, for the driver of the wagon to turn suddenly in leaving the track, as the wheel-rims either become wedged within the groove within which they are seated, or will "skid" or slide for a considerable distance against the side or web of the rail. This wedging and sliding of the wheels has a tendency to weaken, and when the vehicle is heavily loaded and the turn is made suddenly the wrench upon the wheel not unfrequently results in the breaking of the wheel.

The present invention has for its object, among others, the provision of a rail which, while affording at all times a free and uniform track for the car-wheels, will at the same time provide a broad and substantial bearing-surface for vehicle-wheels, the said vehicle-wheel track being so formed as to permit the wheels of a wagon or other vehicle to readily leave the track without the possibility of their being wrenched or broken, and also prevent the wheels from sliding along the web of the rail.

The invention has for a further object the provision of a construction of rail which will admit of its being readily kept free from the accumulation of dirt, which so frequently serves to obstruct the grooves which are formed in rails of ordinary construction.

The invention is clearly illustrated in the accompanying drawings, which, with the letters of reference marked thereon, form a part of this specification, like letters of reference indicating the same parts throughout the several views, and in which drawings—

Figure 1 is a top plan view of a railway-track embodying my invention. Fig. 2 is an enlarged detail in perspective of one of the rails, the form, as shown in full lines, being that designed for use in connection with longitudinal sills or timbers and the change required to adapt the rail to use in connection with cross-ties being indicated in dotted lines. Figs. 3 and 4 are transverse sections upon the lines 3 3 and 4 4, respectively, of Fig. 2, with the rails shown as adapted for use upon cross-ties, as indicated in dotted lines in said Fig. 2.

Reference now being had to the details of the drawings by letter, A designates a street-railway rail embodying my invention. The rail is provided with the track portion B, upon which the car-wheels travel, and upon the inner side of this car-wheel track is provided a broad bearing surface or track C for vehicle-wheels, the said vehicle-wheel track being provided, adjacent to the car-wheel track B, with the usual groove D for the reception of the car-wheel flange, it of course being understood that this groove D is not of sufficient width to allow the wheel of an ordinary vehicle to enter and yet sufficiently wide to afford a ready passage for the flange of the car-wheel. This flat bearing-surface C consists of a series of gradual inclines, as indicated in the drawings, and, as I have shown, a single one in Fig. 2. This incline, it will be observed, commences at the base of the rail and rises gradually to a point slightly below the top of the car-wheel track B, whence it again declines by a gradual and uniform inclination to the base of the rail. Preferably the distances between the point of greatest elevation of one of these inclined surfaces to the point of greatest elevation of the next succeeding incline in the series would be about five feet. These gradual rises and falls in the wagon-track, it will be understood, extend throughout the entire length of the rail, and the inclines of the two opposite tracks or rails correspond as to location.

The base-plate E is of greater width at the points at the foot of the inclines, as shown at E, and the width of the track or thickness of the rail gradually lessens as it approaches the highest point of the incline, thus, as will be readily seen, affording a construction in which it will be possible to readily remove the accumulation of dust or other foreign matter from the flange-groove D of the rail.

It will be observed that the inclined surface of the vehicle-track at the point at which it reaches the level of the top of the car-wheel track merges into a short horizontal plane F, which extends for several inches in the direction of the length of the rail, and at its opposite end the said level space F merges again into the next succeeding downward incline. This short horizontal portion F of the wheel-track is important, as it affords the wheel an opportunity to leave the rail at this point without wrenching.

It is admitted that it is old to construct rails having offsets or flanges which are provided to facilitate the crossing of a wagon over street-car tracks, such a construction being shown in Patent No. 64,297, of 1867, and hence I do not make any broad claim therefor.

Having thus described my invention, what I claim to be new, and desire to secure by Letters Patent, is—

A street-car rail comprising a web portion having a wheel-tread B, a broken series of double gradually-inclined solid portions along the inner edge of the rail forming a groove between same and the wheel-tread B, the sides of the inclined portions being vertical and in parallel planes, substantially as shown and described.

In testimony whereof I affix my signature in presence of two witnesses.

CHAS. PARKER.

Witnesses:
W. L. VAN LOAN,
FRANKLIN H. HOUGH.